3,248,448
ISOMERISATION PROCESS

Anthony George Goble and Michael Jon Holmes, Sunbury-on-Thames, Middlesex, England, assignors to The British Petroleum Company Limited, London, England, a joint-stock company of Great Britain
No Drawing. Filed Oct. 5, 1962, Ser. No. 228,765
Claims priority, application Great Britain, Oct. 11, 1961, 36,486/61
8 Claims. (Cl. 260—683.2)

This invention relates to a process for the isomerisation of olefinic hydrocarbons.

According to this invention there is provided a process for the isomerisation of an olefinic hydrocarbon which is capable of undergoing double bond migration which comprises contacting the olefin with a halogenated alumina catalyst.

The alumina used in the formation of the catalyst will preferably contain some hydrogen. This is a characteristic of activated aluminas which although predominantly alumina do contain a small amount of hydrogen, usually less than 1% wt. This hydrogen is generally considered to be in the form of surface hydroxyl groups, and it is believed that the halogen compound which is used to introduce halogen into the alumina reacts with the surface hydroxyl groups to form the active catalyst sites. Water is, in fact, a product of the reaction, but not all the hydrogen is removed and the treated catalyst still contains a measurable quantity of hydrogen.

Any of the forms of alumina suitable as a base for reforming catalysts may be used, but a particularly preferred form is one derived from an alumina hydrate precursor in which the trihydrate predominates. One containing a major proportion of $\beta$-alumina trihydrate is particularly suitable. A convenient method of preparing the alumina is by hydrolysis of an aluminium alcoholate, for example aluminium isopropoxide, in an inert hydrocarbon solvent, for example, benzene. If desired the alumina may be a treated alumina in which some of the acid sites have been blocked or neutralized.

If desired there may be admixed with the alumina a minor proportion of one or more other refractory oxides selected from Groups II to V of the Periodic Table. Thus the alumina may contain up to 50% wt. of, for example silica, titania, beryllia, zirconia or magnesia.

Preferably the alumina contains a minor proportion of a metal or metal compound, having hydrogenating activity, said metal being selected from Groups VIa or VIII of the Periodic Table. The preferred metal is a platinum group metal which may be present in an amount from 0.01 to 5% wt. and preferably 0.1 to 2% wt. The preferred platinum group metals are platinum and palladium.

Preferably the catalyst is obtained by contacting, at elevated temperature, alumina with the vapour of a halogen compound of methane containing more than one halogen atom per molecule. However, if desired other halogen containing agents may be used.

Preferably the temperature, time of contact and amount of halogen compound used in the formation of the catalyst are such that the up-take of halogen is at least 1% by weight.

The halogen present in the halogen-containing compound used in the formation of the catalyst may be fluorine, chlorine, bromine or iodine; if desired more than one halogen may be present. Preferably there is used a fluorine-containing compound; suitable compounds include methylene difluoride, fluoroform and carbon tetrafluoride.

Preferably the contacting of the alumina with the fluorine compound is carried out under non-reducing conditions to prevent any formation of hydrogen fluoride. A convenient method of contacting is to pass a stream of the vapour over the alumina either alone or admixture with an inert gas, for example nitrogen, or in admixture with an oxygen-containing gas, for example air. The vapour may be recycled, desirably until all the fluoride has been used, and in this way an accurate control of the amount of fluorine taken up by the catalyst may be obtained.

The temperature, time of contact and amount of fluorine compound used affect the amount of fluorine taken up by the catalyst, increase of any of these increasing the amount taken up. In practice temperatures of 350 to 450° C. have been found suitable with contact time of 10 to 30 minutes at 450° C. and up to several hours at 350° C. The amount taken up should not be sufficient to destroy the alumina structure as indicated by X-ray diffraction nor from detectable amounts of aluminium fluoride or volatile platinum-fluorine complexes. It is believed that the fluorine compound reacts with surface hydroxyl groups of the alumina, and water is, in fact a product of the reaction.

The amount of fluorine which can be taken up without altering the alumina structure or forming further compounds on the surface is believed to be function of the specific surface area and may be up to $3.4 \times 10^{-4}$ grams/sq. metre of surface area, and preferably from $1.7 \times 10^{-4}$ to $2.9 \times 10^{-4}$ grams/sq. metre. To obtain high fluorine contents it is thus preferred to use aluminas of high surface area, for example those with a surface area, as measured by nitrogen adsorption using the BET method, of at least 300 sq. metres/gram and such aluminas give a preferred fluorine content of at least 5.0% wt.

Isomerisation in accordance with the present invention may be carried out using as feedstock any olefin capable of double bond migration or a mixture comprising at least one such olefin. Clearly, when employing mixtures, the components will not be present in the equilibrium proportions corresponding to the isomerisation conditions. Double bond isomerisation will usually be effected without producing substantial yields of olefins which have undergone a change of the carbon skeleton.

The olefin may be a mono-olefin, di-olefin or other polyolefin; however, the preferred feedstocks are mono-olefins. Preferably the olefin has 4–6 carbon atoms/molecule.

The process of this invention is particularly suitable for the conversion to 2-methylpentene-2 of 4-methylpentene-1, 4-methylpentene-2 and/or 2-methylpentene-1; also, the conversion to 2-methylbutene-2 of 2-methylbutene-1 and/or 3-methylbutene-1; also for the conversion to cis- and trans-pentene-2 of pentene-1.

Preferably isomerisation is carried out at a temperature in the range ambient —300° C. at any pressure being sub-atmospheric, atmospheric or super-atmospheric. Usually it will be desirable to maintain vapour phase conditions and the pressure will be selected accordingly. Usually the isomerisation will be carried out in the presence of a carrier gas, suitably nitrogen.

The invention is illustrated but not limited with reference to the following examples.

Catalysts A, B and C were selected as follows:

A. Commercial platinum-on-alumina catalyst containing 0.58 percent weight platinum.

B. Commercial platinum-on-alumina catalyst containing 0.37 percent weight platinum.

C. Commercial alumina catalysts (the alumina being similar to that used in the platinum-on-alumina catalysts A and B).

In the preliminary experiments described in Example 1, Catalysts A and C were fluorinated by $CF_4$ to about the 5.0% wt. fluorine level. The resulting catalysts were designated D and E respectively. The benefit of this fluorination is apparent both for the platinum-on-alumina catalyst (compare A and D) and for the alumina catalyst (compare C and E).

EXAMPLE 1

In a series of runs 4-methylpentene-1 was passed, at a partial pressure of 100 mm. of mercury, in nitrogen over a catalyst bed at 130° C. for 2 hours, vapour residence time being 4 seconds.

Product analysis showed the presence of 2-methylpentene-2, 2-methylpentene-1 and by-product, which is mainly cis- and trans-3-methylpentene-2, in the amounts given in Table 1.

*Table 1*

| Catalyst | 2-methyl-2-pentene, percent weight | 2-methyl-1-pentene, percent weight | By-rpoduct (mainly 3-methyl-2-pentene) percent weight |
|---|---|---|---|
| A | 11.7 | 2.8 | Trace |
| D | 55.3 | 13.5 | 4.7 |
| C | Nil | Nil | Nil |
| E | 24.9 | 5.3 | 4.1 |
| Equilibrium values | 67.9 | 18.8 | |

EXAMPLE 2

Catalyst A was treated with carbon tetrafluoride for 10 minutes at 400° C. and a gaseous space velocity of 5 v./v./minute. The catalyst so obtained is designated Catalyst F. In two runs, Catalysts A and F were used to isomerise 4-methylpentene-1 at atmospheric pressure, mid bed temperature 162° ±2° C. and olefin LHSV 0.5 v./v./hr. The benefit of the fluorination treatment is shown by the product analyses given in Table 2.

*Table 2*

| Catalyst | Hours on stream | 4-methyl-pentene-1, percent weight | cis and trans 4-methyl-pentene-2, percent weight | 2-methyl-pentene-2, percent weight | 2-methyl-pentene-1, percent weight |
|---|---|---|---|---|---|
| F | ¾–1 | 2.0 | 15.8 | 62.5 | 17.2 |
|   | 1¼–1½ | 1.0 | 16.0 | 63.5 | 17.5 |
|   | 1¾–2 | 1.5 | 15.0 | 64.5 | 17.5 |
| A | ¾–1 | 2.8 | 44.6 | 42.5 | 10.5 |
|   | 1¼–1½ | 5.3 | 62.5 | 24.5 | 8.0 |
|   | 1¾–2 | 9.5 | 66.2 | 15.8 | 6.5 |

EXAMPLE 3

Catalysts C, B and A were treated with carbon tetrafluoride for 10 minutes at 400° C. and a gaseous space velocity of 5 vol./vol./minute, the resulting catalysts, containing ca. 1.0% by wt. of fluorine, being designated Catalysts G, H and J. These catalysts were used for the isomerisation of 4-methylpentene-1 at 162° C., atmospheric pressure and an olefin liquid hourly space velocity of 1.0 v./v./hr. Product analysis was as shown in Table 3.

*Table 3*

| Product | Catalyst G (fluorinated alumina) | | | Catalyst H (fluorinated pt./alumina) | | | Catalyst J (fluorinated pt./alumina) | | |
|---|---|---|---|---|---|---|---|---|---|
| | Hours on stream | | | Hours on stream | | | Hours on stream | | |
| | 1 | 2 | 3 | 1 | 2 | 3 | 1 | 2 | 3 |
| 2-methylpentene-2 | 20.8 | 16.8 | 16.7 | 53.8 | 49.3 | 47.6 | 59.0 | 61.0 | 57.4 |
| 2-methylpentene-1 | 4.6 | 4.8 | 4.7 | 13.8 | 14.8 | 14.3 | 17.9 | 17.7 | 16.0 |

EXAMPLE 4

Catalysts A and C were fluorinated to a fluorine content of 5% by wt. by treatment with carbon tetrafluoride at 450° C. for 20 minutes, the catalysts so obtained being designated Catalysts K and L respectively.

Catalysts K and L were used for the isomerisation of 4-methylpentene-1 under the conditions described in Example 3. Product analysis is shown in Table 4.

*Table 4*

| Catalyst | HOS[1] | 2-methyl-pentene-2 | 2-methyl-pentene-1 | By-product (mainly cis and trans 3-methyl-2-pentene) percent weight |
|---|---|---|---|---|
| K | 2 | 44.2 | 10.9 | 6.4 |
|   | 3 | 40.7 | 11.0 | 4.0 |
|   | 4 | 43.0 | 10.5 | 5.4 |
|   | 5 | 41.6 | 9.5 | 4.5 |
|   | 6 | 40.5 | 11.2 | 4.3 |
| L | 2 | 33.4 | 7.0 | 3.9 |
|   | 3 | 31.0 | 8.0 | 4.4 |
|   | 4 | 31.7 | 7.5 | 4.5 |
|   | 5 | 29.3 | 8.0 | 4.6 |
|   | 6 | 28.9 | 8.3 | 5.2 |

[1] Hours on stream.

EXAMPLE 5

Catalyst M (fluorinated palladium-alumina) was used for the isomerisation of 4-methylpentene-1 under the conditions described in Example 3. Product analysis is shown in Table 5.

*Table 5*

| Hours on stream | 4-methyl-pentene-1, percent weight | cis/trans 4-methyl-pentene-2 | 2-methyl-pentene-2 | 2-methyl-pentene-1 |
|---|---|---|---|---|
| 4–4½ | 4.6 | 47.3 | 36.5 | 11.6 |
| 5–5½ | 4.4 | 46.5 | 38.6 | 10.5 |
| 6–6½ | 4.8 | 47.7 | 35.6 | 11.9 |

We claim:
1. A process for the isomerisation of an olefinic hydrocarbon which is capable of undergoing double bond migration, which process comprises contacting the olefin with a catalyst prepared by contacting alumina with a fluorinated organic compound of methane containing more than one fluorine atom, under non-reducing conditions and at a temperature in the range 350°–450° C. such that fluorine is taken up by the alumina in amount such that the weight of fluorine retained in the catalyst is at least 1% by weight of the total catalyst yet such that the alumina structure of the catalyst is not destroyed, without the production of free halide.

2. A process according to claim 1 in which said alumina which has been halogenated in an activated alumina containing a small amount of hydrogen.

3. A process according to claim 1 in which said alumina which has been halogenated was halogenated while in admixture with a minor proportion, in total, of another refractory oxide selected from the groups consisting of oxides of metals of groups II, III and IV of the Periodic Table according to Mendeléeff.

4. A process according to claim 1 in which said alumina which has been halogenated was halogenated while admixed with a platinum group metal having hydrogenating activity.

5. A process according to claim 4 in which said substance is selected from the group of metals consisting of platinum and palladium.

6. A process according to claim 1 in which the fluorine containing compound is carbon tetrafluoride.

7. A process according to claim 1 in which said olefinic hydrocarbon is a monoolefin and in which said monoolefin is contacted with said catalyst in the vapour phase and at a temperature less than 300° C.

8. A process according to claim 7 wherein said monoolefin is 4-methylpentene-1.

References Cited by the Examiner
UNITED STATES PATENTS

| | | | |
|---|---|---|---|
| 2,471,647 | 5/1949 | Oblad et al. | 260—683.2 |
| 2,642,384 | 6/1953 | Cox | 208—139 |
| 2,924,629 | 2/1960 | Donaldson | 260—683.2 |
| 3,114,785 | 12/1963 | Hervert et al. | 260—683.2 |

ALPHONSO D. SULLIVAN, *Primary Examiner.*